US011399257B2

(12) United States Patent
Mukherjee et al.

(10) Patent No.: US 11,399,257 B2
(45) Date of Patent: Jul. 26, 2022

(54) METHODS TO PREEMPTIVELY AUTOCONFIGURE A MOBILE NETWORK TO RESPOND TO EXTERNAL EMERGENCIES

(71) Applicant: Cisco Technology, Inc., San Jose, CA (US)

(72) Inventors: Arghya Mukherjee, Acton, MA (US); Om Prakash Suthar, Bolingbrook, IL (US); Vivek Agarwal, Chelmsford, MA (US); Amarnath Sury Arvind, Hinsdale, IL (US); Rajiv Asati, Morrisville, NC (US); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

(21) Appl. No.: 16/542,591

(22) Filed: Aug. 16, 2019

(65) Prior Publication Data

US 2021/0051437 A1 Feb. 18, 2021

(51) Int. Cl.
*H04W 4/021* (2018.01)
*H04W 4/90* (2018.01)
(Continued)

(52) U.S. Cl.
CPC ......... *H04W 4/022* (2013.01); *H04L 12/4641* (2013.01); *H04L 67/04* (2013.01);
(Continued)

(58) Field of Classification Search
CPC ............. H04L 41/0803; H04L 41/5025; H04L 12/4641; H04W 24/02; H04W 36/005; H04W 4/025; H04W 4/90
See application file for complete search history.

(56) References Cited

U.S. PATENT DOCUMENTS

| 10,210,010 B1 * | 2/2019 | Ramachandran ... H04L 41/0668 |
| 2014/0029439 A1 * | 1/2014 | Shaw .................... H04W 24/08 370/241 |

(Continued)

OTHER PUBLICATIONS

Federal Communications Commission, "Emergency Communications", 7 pages, downloaded from Internet Aug. 15, 2019; https://www.fcc.gov/consumers/guides/emergency-communications.

(Continued)

*Primary Examiner* — Margaret G Mastrodonato
(74) *Attorney, Agent, or Firm* — Edell, Shapiro & Finnan, LLC

(57) ABSTRACT

Methods are provided to preemptively reconfigure a mobile network to respond to external emergencies. The method is performed at a network device of a service provider which provides access to a mobile network for wireless device. The method includes obtaining a message indicating an occurrence of a disaster. The message includes at least an emergency type and location information. The method further includes determining, based on the emergency type, a reconfiguration policy for reconfiguring the mobile network in an area indicated by the location information and reconfiguring the mobile network based on the reconfiguration policy. The method further includes authenticating a disaster application function and a notification message informing about an occurrence of a disaster.

20 Claims, 7 Drawing Sheets

(51) Int. Cl.
　　　H04W 4/02　　　(2018.01)
　　　H04L 67/04　　　(2022.01)
　　　H04L 12/46　　　(2006.01)
　　　H04W 8/24　　　(2009.01)
　　　G06Q 50/26　　　(2012.01)
(52) U.S. Cl.
　　　CPC .............. *H04W 4/025* (2013.01); *H04W 4/90* (2018.02); *H04W 8/245* (2013.01); *G06Q 50/26* (2013.01)

(56)　　　　　References Cited

U.S. PATENT DOCUMENTS

| | | | | |
|---|---|---|---|---|
| 2014/0047034 | A1* | 2/2014 | Holtmanns | H04W 12/106 709/204 |
| 2016/0105784 | A1* | 4/2016 | Gellens | H04W 4/90 455/404.1 |
| 2018/0359337 | A1* | 12/2018 | Kodaypak | H04L 43/08 |
| 2021/0153078 | A1* | 5/2021 | Condoluci | H04W 28/24 |

OTHER PUBLICATIONS

Wikipedia, "First Responder Network Authority", 4 pages, downloaded from Internet Aug. 15, 2019; https://en.wikipedia.org/wiki/First_Responder_Network_Authority.

3GPP, "Universal Mobile Telecommunications System (UMTS)", 3GPP TS 29.168 version 12.9.0 Release 12, (Jan. 2016), 48 pages.
3GPP, "5G; Systems Architecture for the 5G System", 3GPP TS 23.501 version 15.2.0 Release 15, ETSI TS 123 501 V15.2.0 (Jun. 2018), pp. 1-105.
3GPP, "5G; Systems Architecture for the 5G System", 3GPP TS 23.501 version 15.2.0 Release 15, ETSI TS 123 501 V15.2.0 (Jun. 2018), pp. 106-219.
3GPP, "5G; Procedures for the 5G System", 3GPP TS 23.502 version 15.2.0 Release 15, ETSI TS 123 502 V15.2.0 (Jun. 2018), pp. 1-100.
3GPP, "5G; Procedures for the 5G System", 3GPP TS 23.502 version 15.2.0 Release 15, ETSI TS 123 502 V15.2.0 (Jun. 2018), pp. 101-201.
3GPP, "5G; Procedures for the 5G System", 3GPP TS 23.502 version 15.2.0 Release 15, ETSI TS 123 502 V15.2.0 (Jun. 2018), pp. 202-311.
3GPP, "5G; System Architecture for the 5G System", 3GPP TS 23.501 version 15.3.0 Release 15, ETSI TS 123 501 V15.3.0 (Sep. 2018), pp. 1-113.
3GPP, "5G; System Architecture for the 5G System", 3GPP TS 23.501 version 15.3.0 Release 15, ETSI TS 123 501 V15.3.0 (Sep. 2018), pp. 114-227.
3GPP, "Universal Mobile Telecommunications System (UMTS); LTE; Cell Broadcast Centre interfaces with the Evolved Packet Core; Stage 3", 3GPP TS 29.168 version 15.1.0 Release 15, ETSI TS 129 168 V15.1.0 (Sep. 2018), 56 page.

* cited by examiner

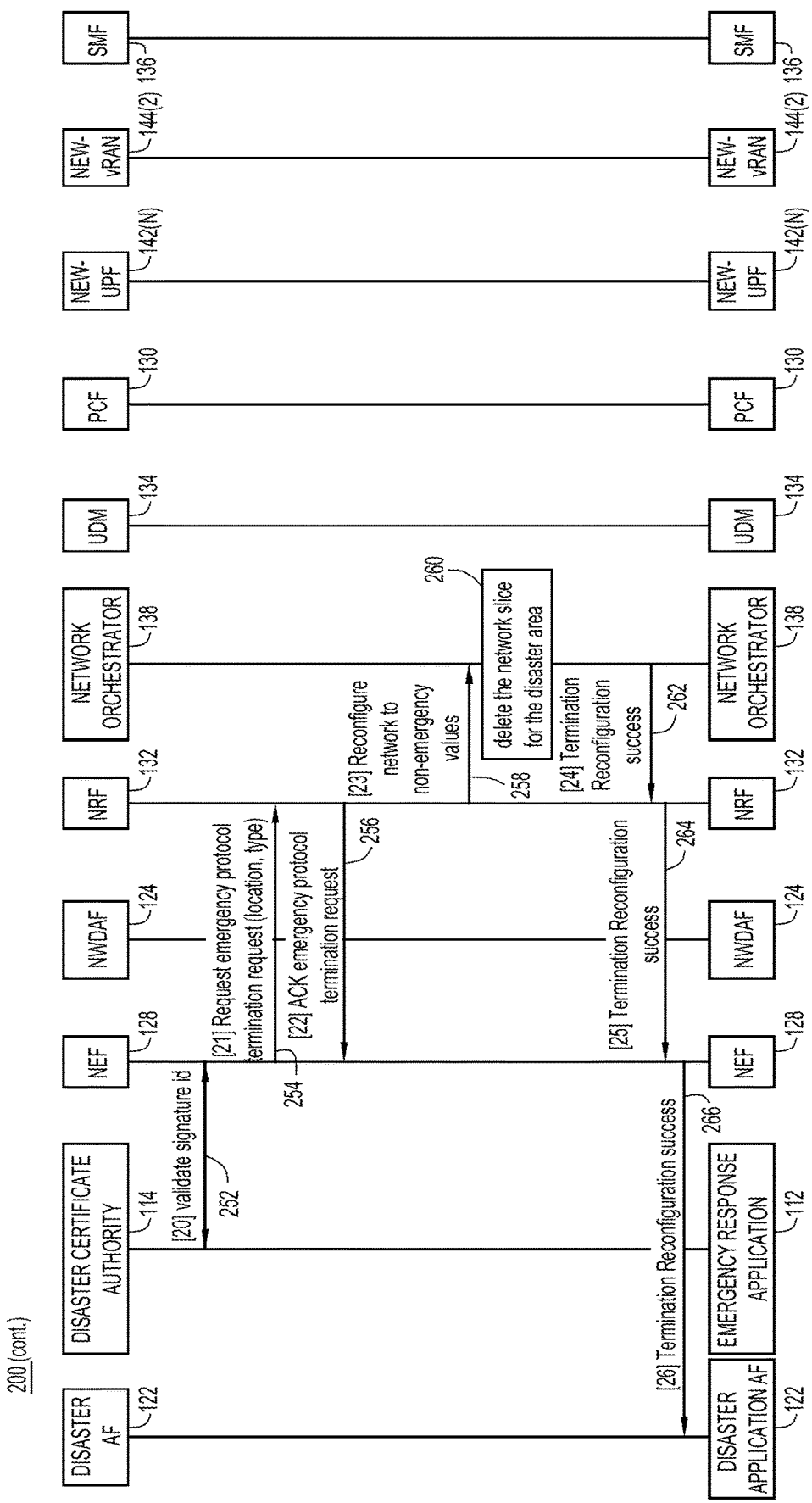

METHODS TO PREEMPTIVELY AUTOCONFIGURE A MOBILE NETWORK TO RESPOND TO EXTERNAL EMERGENCIES

TECHNICAL FIELD

The present disclosure relates to mobile systems/networks.

BACKGROUND

When a disaster strikes, reliable communication with the public is needed in order to provide information about of the disaster and related emergency services and other relief efforts in order to mitigate damages. Government emergency agencies implement manual disaster recovery protocols that involve communications across different areas. For example, a U.S. First Responder Network Authority (First-Net) is an independent authority entity that maintains an interoperable public safety broadband network. It is responsible for emergency communications such as 911 call processing, emergency alert systems, and providing radio and/or television broadcasting news and updates.

A network infrastructure is relied on to communicate with the public about the disaster. The U.S. Disaster Information Reporting System (DIRS) is responsible for monitoring impact of a disaster on the network infrastructure based on voluntary reports from various service providers. While a disaster may cripple the network infrastructure, service providers are still expected to provide reliable communication to mitigate damages.

BRIEF DESCRIPTION OF THE DRAWINGS

FIGS. 2A-2C are operational flow diagrams illustrating a method of handling network reconfigurations to account for a disaster, according to an example embodiment.

DESCRIPTION OF EXAMPLE EMBODIMENTS

Overview

Figure 1:
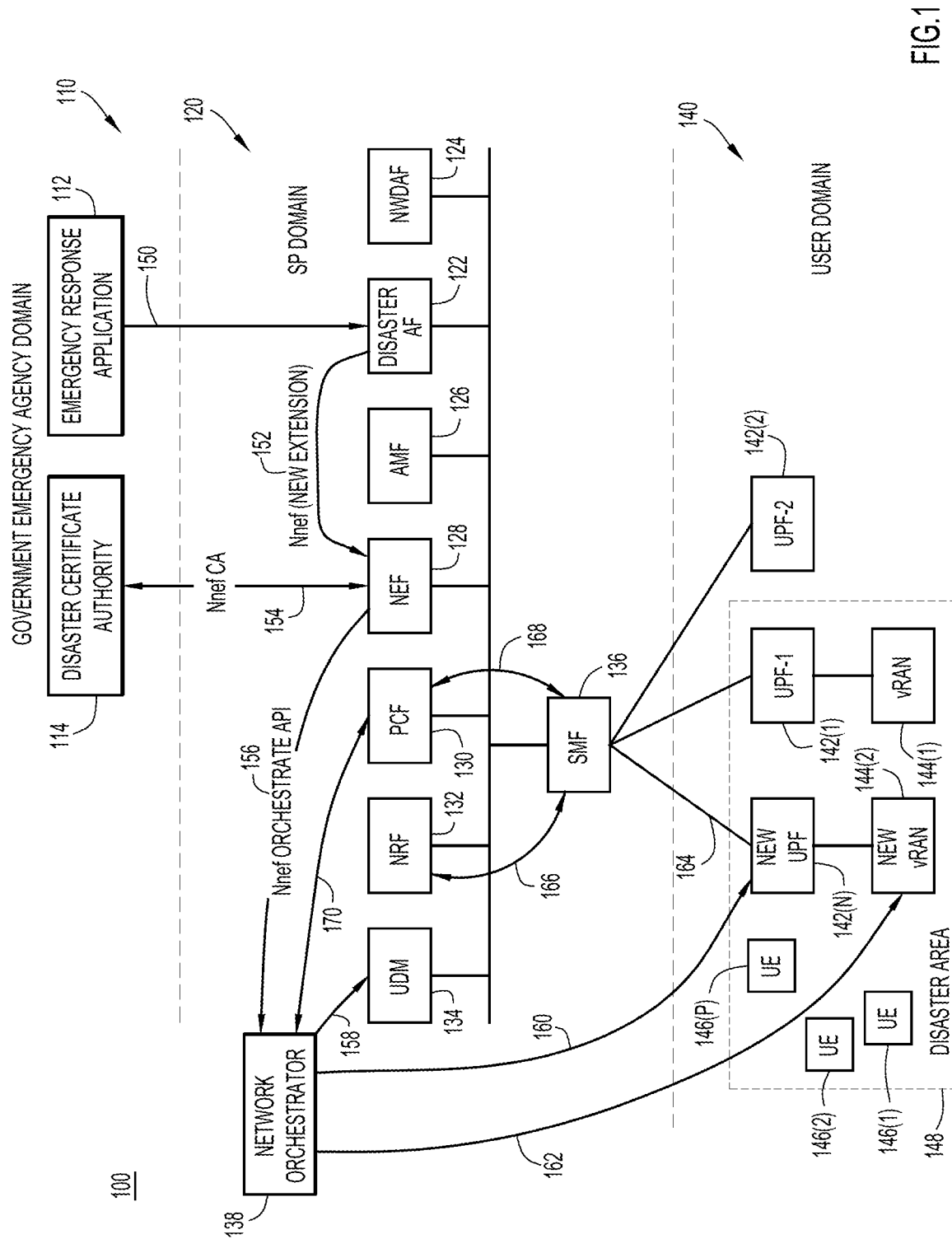
FIG. 1 is a block diagram of a network architecture for handling network reconfigurations to account for a disaster, according to an example embodiment.

Briefly, a method and system to respond and reconfigure a mobile network to account for a disaster is provided. The method is performed by a network device of a service provider which provides access to a mobile network for wireless devices. The method includes obtaining a message indicating an occurrence of a disaster. The message includes an emergency type and location information. The method further includes determining, based on the emergency type, a reconfiguration policy for reconfiguring the mobile network in an area indicated by the location information. Finally, the method includes reconfiguring the mobile network based on the reconfiguration policy.

Additionally, a method to validate a notification message indicating an occurrence of a disaster is provided. The method is performed at a network device of a mobile network. The network device executes a network exposure function (NEF) in a service provider domain. The method includes receiving, by the NEF from a disaster application function, a notification message indicating an occurrence of a disaster. The disaster application function is authenticated with an authentication server based on attributes included in the notification message. The method further includes, based on the notification message being authenticated, providing to an orchestrator function of the mobile network a request to reconfigure the mobile network to account for the disaster.

Example Embodiments

When a disaster occurs, communication is needed to inform the public about the disaster and efforts to provide emergency services. In one or more example embodiments, a mechanism is presented herein to dynamically handle network reconfiguration during an emergency/disaster to meet different set of demands that are placed on the network is provided. The demands depend on consumer usage patterns, as well as possible degradation of the network capacity due to the emergency.

Many service provider networks have extensive constructs for detecting and adapting to failures within the network. Examples of such failures result in an action that a service provider may take to protect the network assets and provide remediation services. For example, for transport network failure detection techniques include a link failure detection, Virtual Router Redundancy Protocol (VRRP), Bidirectional Forwarding Detection (BFD), and routing algorithms that adapt to sections of networks that are failing. However, when external disasters occur, such as an earthquake or a tsunami, the damage to the infrastructure and likely impact to communications may not correlate to the impact to the service provider's infrastructure. Furthermore, as recovery and rescue services arrive to the affected location, those services need the network to support the new network load.

An example embodiment provides a mechanism in which an external governmental or scientific disaster detection agency (Disaster Agency) can communicate to the network about the nature and scope of the disaster, such as the geographical coordinates impacted by the disaster. Based on this information and network topology, the service provider can determine the affected subscribers. The service provider may take various actions including reconfiguring the network to provide priority to emergency services.

In one or more example embodiments, an automated method that identifies the nature and scope of a disaster and provides this information to one or more service providers, is provided. Further, based on this information, service providers dynamically reconfigure the affected infrastructure to account for the disaster.

A disaster is a sudden event that causes loss or damage to an affected community or geographical location. Natural disasters may include a tsunami, an earthquake, a wildfire, a tornado, and a flood. Human-created disasters include a terrorist attack, a traffic accident, or a building fire. A disaster includes various other emergencies or emergency situations. These are just some non-limiting examples of a disaster.

In an example embodiment, an enhancement or an additional method to communicate the nature and scope of an emergency from a Disaster Agency (DA) is provided using a fifth generation (5G) virtualized mobile network core, for example. With a virtualized network infrastructure, a service provider can manage a response to any disasters effectively. With dynamic and auto-scaled virtualized networks, a service provider may autonomously and automatically re-configure and possibly re-instantiate functional resources at the applicable location(s), and maintain optimal services or prioritize certain users as necessary.

FIG. 1 is a block diagram of a network architecture 100 for handling network reconfigurations to account for a disaster, according to an example embodiment. The network architecture 100 includes a government emergency agency domain 110, a service provider (SP) domain 120, and a user domain 140.

The government emergency agency domain 110 includes an emergency response application 112 and a disaster certificate authority 114. The emergency response application 112 informs one or more service providers about an occurrence of a disaster. A disaster certificate authority 114 is a certificate authority server that issues digital certificates. A digital certificate certifies ownership with a public key (signature identifier) by the named subject (application function) of the certificate. The certificate allows for reliance on signatures or assertions made about the private key. The disaster certificate authority 114 acts as a trusted third party because it is trusted by both the owner of the certificate (application function) and the party relying upon the certificate (another function). Various formats for the certificates are known such as the ones that are specified by the X.509 X. public key infrastructure (PKI) standard.

The SP domain 120 is a control plane that enables authorized network functions, such as disaster application function (disaster AF) 122, to access services provided by the control plane. The control plane includes common control network functions that support, manage, and control the mobile network (all sessions in the mobile network of a service provider) and slice specific core network functions which support a particular portion or an area of the mobile network.

The common control network functions include a network data analytics function (NWDAF) 124 and an access and mobility function (AMF) 126. The NWDAF 124 is responsible for providing network analytic information upon request from network functions. For example, another network function may requests specific analytic information such as used and available capacity, NFVI resources, subscriber geo-locations and applications within a particular network slice during a disaster. The NWDAF 124 provides the requesting network function with the load level information in real-time. In an example embodiment, various network slices report to NWDAF 124 with load level, and other performance parameter information. The AMF 126 is a mobility management entity (MME) that manages network connections between user equipment (UE) and base stations. Additionally, the common control network functions include a network slice selection function (NSSF), not shown, which selects a slice specific core network functions, explained below.

The slice specific core network functions are separated into a control plane functions and user plane network functions. The control plane carries network or control signaling and the user plane carries wireless device traffic. Separating user and control planes allows for each plane's resource to be scaled independently of one another, and allows them to be deployed separately.

Network functions in the control plane are modularized functions having independent evolution and scaling. In FIG. 1, the slice specific core network functions include: a Network Exposure Function (NEF) 128, a Policy Control Function (PCF) 130, a Network Repository Function (NRF) 132, a Unified Data Management (UDM) 134, and a Session Management Function (SMF) 136. Additionally, a network orchestrator 138 is provided to orchestrate mobile network configuration in the SP domain 120. The network orchestrator 138 allocates resources in the mobile network.

The NEF 128 securely exposes services and capabilities provided by application functions, such as the disaster AF 122, to the internal control functions. The NEF 128 validates the disaster AF 122 and communicates with other control plane functions and the network orchestrator 138. The PCF 130 governs network behavior by providing policy rules to the control plane functions. The PCF 130 executes policy and charging rules functions. The PCF 130 may obtain various configuration policies for the mobile network from a unified data repository (not shown) based on various policy rules and provide the retrieved configuration policies to the control plane functions. The NRF 132 provides a network function service registration and discovery. It enables network functions to identify appropriate services. For example, the NRF 132 allows the SMF 136 to discover new functions and to instantiate new virtual network functions (VNFs). The UDM 134 is responsible for retrieving subscription data in a respective network slice i.e., from a unified data repository (UDR), not shown. The subscription data may include information about respective subscribers/UEs. Some subscription data may include additional information to indicate that the associated subscribers/UEs are emergency worker subscribers and/or first responders. The SMF 136 handles management of sessions, including allocating IP addresses to UEs and allocating various resources in user domain 140.

The network orchestrator 138 configures and/or reconfigures the mobile network according to various policies e.g., to accommodate for a disaster, in communication with other functions of the control plane. The network orchestrator 138 generates various network resources and allocates them to a disaster area. That is, the network orchestrator 138 instantiates (generates or launches new instances of) various network resources and configures them based on various policies and modeling information.

The user domain 140 is a user plane of the 5G network and includes resources for UEs 146(1)-146(P) in a disaster area 148. The disaster area 148 is an area in a network infrastructure that is possibly impacted or affected by a disaster. The user domain 140 includes user plane functions (UPFs), including UPF1 shown at 142(1), UPF2 shown at 142(2), and a New UPF shown at 142(N). The UPFs 142(1)-142(N) implement software gateway functions including packet routing and forwarding of traffic to and from UEs 146(1)-146(P) and also support quality of service (QoS) handling. The UPFs 142(1)-142(N) utilize services of the SMF 136 and interconnect UEs 146(1)-146(P) to the core network via a radio access network (RAN) provided by virtual RANs. FIG. 1 shows a vRAN 144(1) and a new vRAN 144(2). The vRANs 144(1) and 144(2) are a centralized pool of baseband units (of base stations) that may be allocated to various network slices on per need basis. For example, the disaster area 148 may be allocated additional vRANs to accommodate increased demand from the UEs 146(1)-146(P). Such an additional vRAN is shown by way of example at 144(2).

The UEs 146(1)-146(P) include user devices, user equipment, endpoint devices, and Internet of Things (IoT) devices. The UEs 146(1)-146(P) may include, but are not limited to, a personal computer (PC) such as a desktop or a laptop, a consumer device such as a personal digital assistant (PDA) or a smart phone. The UEs 146(1)-146(P) may further include medical equipment, smart appliances, commercial security systems, industrial systems, sensors, and so on. The UEs 146(1)-146(P) are connected to public network(s) such as Internet via various radio access networks such as Wi-Fi™, other wireless local area networks (WLANs), and wireless wide area networks (WWANs). In an example embodiment, the UEs 146(1)-146(P) communicate via the 5G network.

In FIG. 1, the number of UPFs, vRANs, and UEs is provided by way of an example only and is not limiting. Actual number of elements, components, and/or devices will depend on a particular implementation. For example, the number of UEs that are connected to the UPFs is based on a type of application accessed and applications hosted thru the UPF. Additionally, in FIG. 1, only one network slice is shown by way of a non-limiting example. The number of network slices will vary based on a particular implementation. Further, various network slices may be impacted by a disaster and one or more of the UEs may be communicating via several network slices.

Operations of the network architecture 100 of FIG. 1 for handling network reconfigurations to account for a disaster are now described, according to an example embodiment. In the network architecture 100, various network functions communicate with each other via various communication interfaces such as service-based interfaces. For example, the network functions communicate via various application interfaces (API) that define communications and protocols between them.

In FIG. 1, at 150, the emergency response application 112 informs the disaster AF 122 that a disaster has occurred. Based on the information received, the disaster AF 122 selects one or more respective network slice(s). The disaster AF 122 process the received information and determines the geo-spatial domain affected or potentially affected by the disaster. In an example embodiment, the disaster AF 122 may have different thresholds set to determine emergency conditions (severity of the disaster) and the affected geographical area. Based on the affected area, the disaster AF 122 will select one or more NEFs, such as NEF 128, which is/are responsible for handling the mobile network in the affected area. Using the information provided by the emergency response application 112, the disaster AF 122 also generates attributes for a message to be transmitted via an API between the disaster AF 122 and the selected NEF (the NEF 128).

To this end, the disaster AF 122 generates a message that includes information about the disaster (the generated attributes) and provides the message via the Nnef API 152, to the selected NEF 128. The Nnef API 152 is a service-based interface API defined in the applicable standard(s). According to one embodiment, the Nnef API 152 is extended with a new service type. For example, a new service type is defined in Technical Specification (TS) 23.502, clause 5.2.6, or in an extension to NEF Nnef_Parameter defined in TS 23.502, clause 5.2.6.4. In an example embodiment, the Nnef API 152 is extended for a disaster mitigation service type.

The message generated by the AF 122 is a request for reconfiguration of the mobile network and includes information about the disaster, such as generated attributes. The attributes may include: (1) emergency type (Class of emergency—tsunami, earthquake, wildfire, tornado, flood, terrorist attack, and so on), (2) emergency priority (number or a value in which the higher the number assigned, the greater imperative or impact to the service provider), (3) geo-spatial domain (geographical locations that are affected by the disaster or emergency), (4) subscriber groups affected (this may be multiple groups based on information from the one or more disaster recovery agencies) and optionally actions required for the affected subscriber groups, (5) duration of a disaster or emergency, and (6) disaster authority signature (a signature from a specific authority that has made the judgement to request an emergency).

For example, the attributes are provided in three different types of data fields (in an extension to a clause TS 23.501, clause 5.6.7). The message would include a disaster request identifier, a service identifier (indicating that it is an emergency), attributes, and authentication values. The disaster request identifier is used to validate the message and to terminate the disaster. That is, once the disaster or emergency has passed, the disaster AF 122 revokes the validity of the disaster request identifier. The message is received by the NEF 128 via the Nnef API 152 and is processed by the NEF 128.

The NEF 128 determines whether the received message is valid. That is, at 154, the NEF 128 communicates with the disaster certificate authority 114 to authenticate the disaster notification (the message). The NEF 128 validates the credentials of the disaster AF 122 and authenticates the disaster notification (the message) using the disaster request identifier.

In an example embodiment, the certificates may be geo-distributed but centrally coordinated across multiple service providers and government agencies. The disaster AF 122 is issued a certificate (an emergency action certificate and a public key corresponding to a signature identifier) by the disaster certificate authority 114. Based on the signature and a request identifier provided at 152, the NEF 128 transmits an authentication request to the disaster certificate authority 114 via a new API denoted Nnef CA, which has a service type "verify emergency notification". The disaster certificate authority 114 cross verifies the disaster notification (message) and the emergency actions certificate (the disaster AF 122) and issues a response indicating whether the request identifier is still valid and whether the disaster notification is issued by a registered/validated disaster AF 122. The disaster certificate authority 114 maintains and updates security state(s) with actions across multiple service providers.

If the disaster certificate authority 114 indicates that either the message or the disaster AF 122 is not validated/authentic, the NEF takes no further action and/or performs an error handling procedure. On the other hand, if the disaster certificate authority 114 indicates to the NEF 128 that the notification message is received from a legitimate and/or valid disaster AF and the request identifier is also valid, the NEF 128 requests a reconfiguration of the mobile network to account for the disaster.

Specifically, at 156, the NEF 128 provides, to the network orchestrator 138, a request to reconfigure the mobile network in the affected area (the disaster area 148). The NEF 128 provides the request to reconfigure via a newly defined API denoted Nnef Orchestrate API. The request includes information about a location affected by the disaster, a disaster type, and other disaster related information, such as severity and duration of the disaster. The network orchestrator 138 performs an automated network reconfiguration to prioritize services in the affected area, based on the information in the request.

At 158, the network orchestrator 138 communicates with the UDM 158 to update credentials for the UEs 146 of the first responder and/or emergency worker subscribers to provide Enhanced Multimedia Priority Service (eMPS) and/ or similar enhanced QoS (e.g., as specified in TS 23.502, clause 4.15.6.2). That is, based on the updated credentials in the UDM 134, the SMF 136 will prioritize these subscribers and provide an enhanced QoS to their respective UEs. For example, UE 146(2) may be deemed a priority subscriber UE and be given enhanced QoS. The enhanced QoS is a guaranteed service level that includes one or more of increased speed, increased bandwidth, and enhanced performance parameters such as delay thresholds, jitter thresholds, and/or packet loss thresholds.

Additionally, the network orchestrator 138 uses the locality, severity, and duration of the disaster provided in the reconfiguration request to auto-configure and instantiate virtual network functions (VNFs) to maintain service continuity and/or add new services for first responders and affected subscribers. The network orchestrator 138 adds and/or reallocates resources of the mobile network to account for the disaster. The resources include one or more of VNFs and/or other functions. For example, an access point/base station of a neighboring locality may be reconfigured to, instead, provide services to the UEs 146(1)-146(P) in the disaster area 148 or to provide services exclusively to the subscriber(s) with enhanced QoS credentials (e.g., UE 146(2)) in the disaster area 148.

In FIG. 1, at 160, the network orchestrator 138 adds a new UPF to the already existing UPFs. For example, the new UPF 142(N) is added to accommodate the UE 146(1)-146(P) in the disaster area 148. At 162, the network orchestrator 138 adds the new vRAN 144(2) which corresponds to the newly added UPF 142(N). The new vRAN 144(2) is added to existing vRANs, e.g., vRAN 144(1) to accommodate the UEs 146(1)-146(P) in the disaster area 148. In one example embodiment, the new UPF 142(N) and the new vRAN 144(2) are dedicated to UE 146(2) having enhanced QoS credentials such as UEs used by the first responders and emergency workers. Other network functions and/or resources may also be instantiated in geographically pertinent locations (the disaster area 148).

At 164, the SMF 136 is informed about the instantiation of the new UPF 142(N) and the new vRAN 144(2) so that at least some of the sessions of the UEs 146(1)-146(P) are allocated to the newly instantiated resources.

At 166, the SMF 136 may register the newly instantiated resources (the new UPF 142(N) and the new vRAN 144(2)) with the NRF 132. At 168, the SMF 136 may request policies related to the emergency type specified in the request and configure the newly instantiated resources in accordance with the retrieved policy. For example, the SMF 136 may allocate mobile sessions of a set of UEs, e.g., UE 146(2), to the newly instantiated resources. The policies provided by the PCF 130 may be obtained based on the information from the network orchestrator 138. That is, at 170, the network orchestrator 138 may pre-configure the network with specific actions and identify a groups of users impacted by the disaster based on the notification message provided via the Nnef Orchestrate API at 156. The PCF 130 provides this information so that a corresponding configuration policy or policies can be retrieved from the PCF 130 by the SMF 136.

Figure 2A:
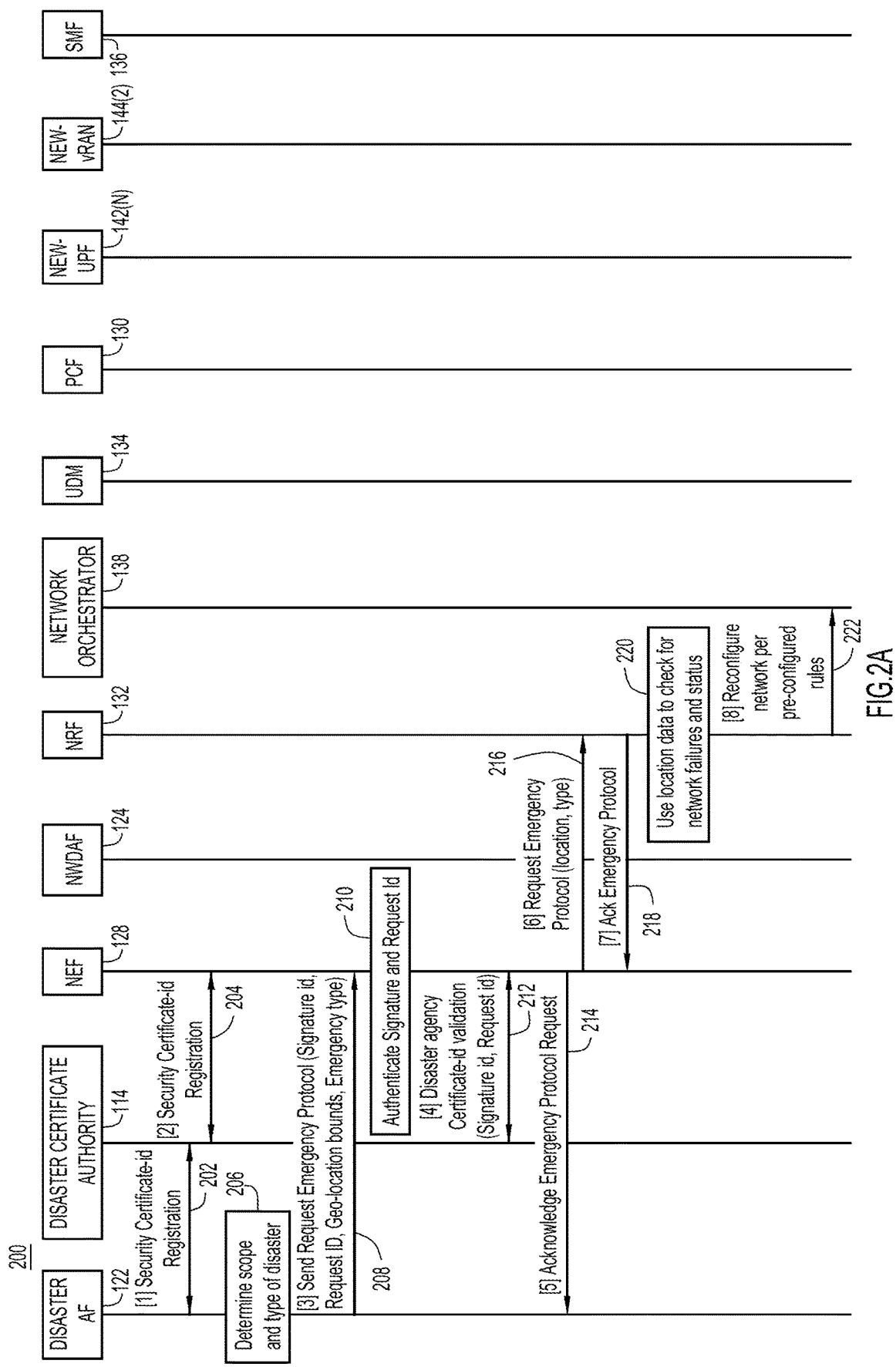
Figure 2B:
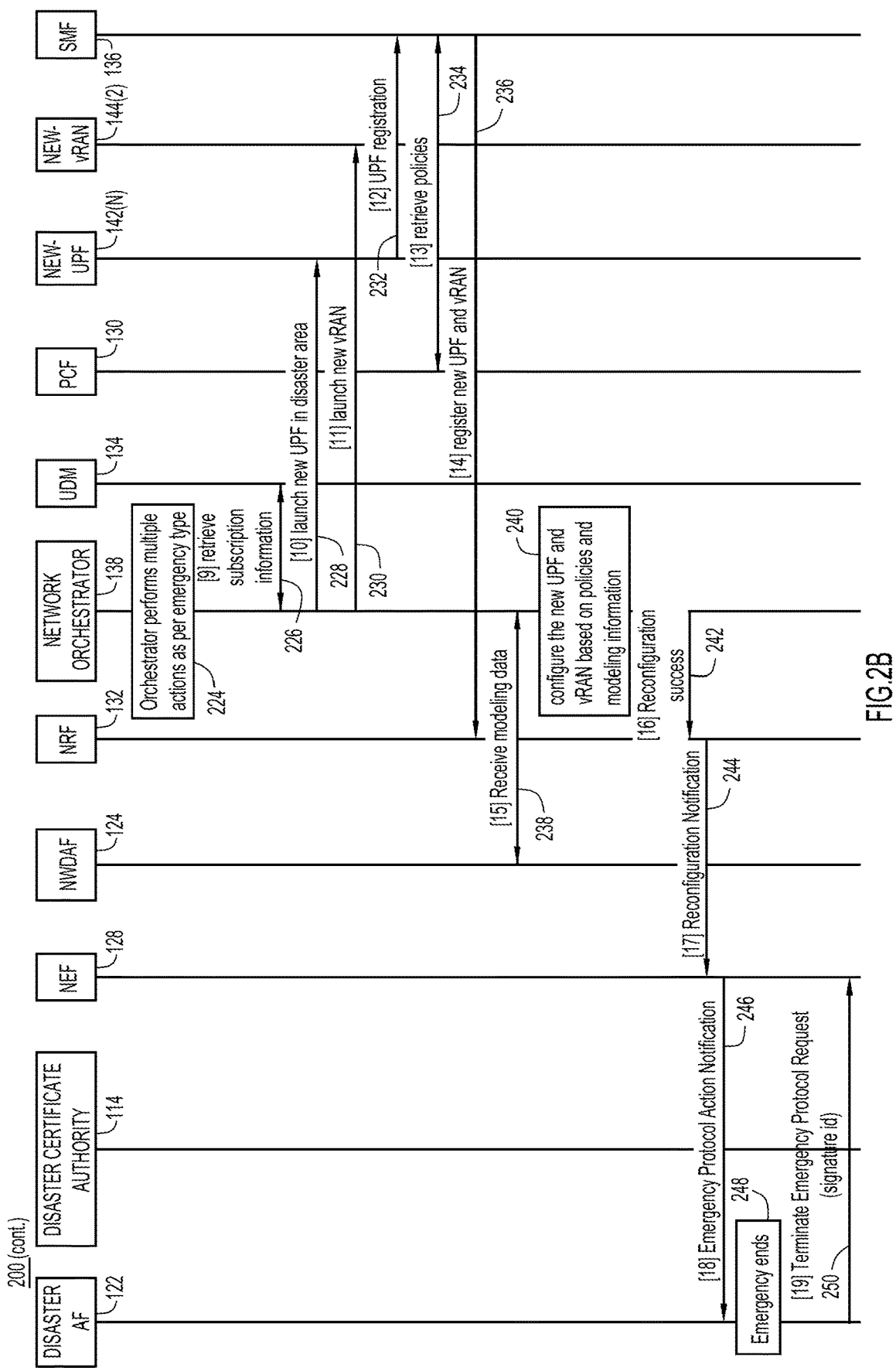

Reference is now made to FIGS. 2A-2C, with continued reference to FIG. 1. FIGS. 2A-2C are operational flow diagrams illustrating a method 200 of handling network reconfigurations to account for a disaster, according to another example embodiment. FIGS. 2A-2C illustrate a call flow for reconfiguring the mobile network to account for the disaster. The call flow includes interactions among the disaster AF 122, the disaster certificate authority 114, the NEF 128, the NWDAF 124, the NRF 132, the network orchestrator 138, the UDM 134, the PCF 130, the new-UPF 142(N), the new-vRAN 144(2), and the SMF 136.

In FIG. 2A, at 202, the disaster AF 122 registers with the disaster certificate authority 114 (security certificate-identifier (certificate-id) registration). That is, the disaster AF 122 requests a certificate identifier (ID) from the disaster certificate authority 114. The disaster certificate authority 114 generates and issues the digital certificate for the disaster AF 122. The disaster certificate authority 114 provides the issued certificate, in a form of a public key or signature-ID, to the disaster AF 122 disaster certificate authority. disaster certificate authority At 204, analogous registration is performed by the NEF 128, according to one example embodiment. That is, the disaster certificate authority 114 provides a certificate to the NEF 128. The certificates allows the functions to rely on signatures or assertions made about the private key that corresponds to the certified public key. The disaster certificate authority 114 acts as a trusted third party that issues and validates (authenticates) the certificates.

At 206, based on a notification from an emergency response application (not shown), the disaster AF 122 determines the scope and type of a disaster. At 208, the disaster AF 122 sends, to the NEF 128, a request emergency protocol (via the aforementioned extension to the Nnef API 152). The request includes signature-ID, the request identifier (request ID), geo-location bounds, and an emergency type determined at 206.

At 210, the NEF 128 determines to authenticate the signature-ID and the request ID. Specifically, at 212, the NEF 128 communicates with the disaster certificate authority 114 validates the disaster AF 122 and to authenticate the request ID based on a disaster agency certificate ID validation message that includes a signature-ID and the request ID.

At 214, the NEF 128 acknowledges the emergency protocol request by sending an acknowledgement message back to the disaster AF 122. If the disaster AF 122 or the request ID is not authenticated or validated, the NEF 128 may send an error message to the disaster AF 122 instead of the acknowledgement message.

The NEF 128 communicates with the NRF 132 to request a reconfiguration of the mobile network to account for the disaster. That is, at 216, the NEF 128 sends, to the NRF 132, a request emergency protocol message. The request emergency protocol message includes at least a location of the disaster and a type of the disaster. At 218, the NRF 132 sends an acknowledgement message to the NEF 128 acknowledging receipt of the request emergency protocol message.

At 220, the NRF 132 checks for network failures and status information reported in the disaster area 148 based on the location of the disaster received at 216. The status information may include performance of the mobile network in the disaster area 148 (speed, bandwidth availability, jitter, and so on). The NRF 132 includes pre-configured rules to account for network failures, degraded performance, and other network conditions. Based on the determined network status and detected network infrastructure failures in the disaster area 148, the NRF 132 retrieves one or more of corresponding pre-configured rules from a network policy repository (not shown). At 222, the NRF 132 sends the retrieved rules to the network orchestrator 138 for implementation. The configuration policies or rules may be categorized based on an emergency type and/or emergency priority level. For example, an amount of new resources allocated to the disaster area 148 may be based on emergency priority level. Further, different types of emergencies may require different network resources.

The method 200 is further illustrated in FIG. 2B. In FIG. 2B, at 224, the network orchestrator 138 executes multiple actions based on the pre-configured rules which also include an emergency type information, received at 222.

At 226, the network orchestrator 138 communicates with the UDM 134 to retrieve subscriber information and determine affected UEs. The network orchestrator 138 may also update credentials of the subscribers in the disaster area 148 to provide enhanced QoS services.

At 228, the network orchestrator 138 launches New-UPF 142(N) and at 230, the network orchestrator 138 launches New-vRAN 144(2).

At 232, the New-UPF 142(N) communicates with the SMF 136 to inform the SMF 136 of its existence by conveying various parameters such as network resources (IP address, VLAN) and compute resources (CPU, memory, I/O) and applications status (running, initiated, shutdown etc.). At 234, based on receipt of the message from the New-UPF 142(N), the SMF 136 retrieves policies from the PCF 130 for the configuration of the New-UPF 142(N) and for the New-vRAN 144(2).

At 236, the SMF 136 communicates with the NRF 132 to register the New-UPF 142(N) and the New-vRAN 144(2) in a function repository (not shown). Though not shown in the FIG. 2, the SMF 136 provides the retrieved policies to the network orchestrator 138. At 238, the network orchestrator 138 receives modeling data from the NWDAF 124. The modeling data may include information about predicated network performance based on reports from network infrastructure. At 240, the network orchestrator 138 configures the New-UPF 142(N) and the New-vRAN 144(2) based on the policies received from the SMF and based on modeling data from the NWDAF 124.

At 242, the network orchestrator 138 sends a message to the NRF 132 indicating network reconfiguration success. At 244, the NRF 132 sends the reconfiguration notification to the NEF 128. At 246, the NEF 128 sends an emergency protocol action notification to the disaster AF 122.

At 248, the disaster AF 122 is notified by the emergency response application 112 (for example) that the disaster has ended. At 250, the disaster AF 122 sends, to the NEF 128, a termination emergency protocol request which includes a request identifier (request ID) and a signature identifier (Signature-ID). The request identifier is invalidated for a disaster that has terminated.

The method 200 is further illustrated in FIG. 2C. At 252, the NEF 128 communicates with the disaster certificate authority 114 to authenticate or validate the disaster AF 122. Based on the NEF 128 validating the disaster AF 122, at 254, the NEF 128 sends, to the NRF 132, emergency protocol termination request.

At 256, the NRF 132 acknowledges the request and at 258, the NRF 132 transmits, to the network orchestrator 138, a request to reconfigure the network to non-emergency values.

At 260, the network orchestrator 138 deletes the New-UPF 142(N) and the New-vRAN 144(2) (collectively the newly added network slice) for the disaster area 148. At 262, the network orchestrator 138 transmits a termination reconfiguration success to the NRF 132. At 264, the NRF 132 informs the NEF 128 of the termination reconfiguration success and at 266, the NEF 128 informs the disaster AF 122 of the termination reconfiguration success.

Accordingly, in one or more example embodiments, the functionality of the NEF 128 is extended, modified, and/or enhanced. First, the Nnef API is extended to provide information from a government or an external domain to mitigate impact to a network infrastructure from a disaster. Second, the Nnef API is defined or extended to communicate with the disaster certificate authority 114 to perform emergency actions authentication, scope authorization, and monitoring through dynamic certificate validations and issuance. In one example embodiment, a hierarchical certificate management system is provided so that a level of a certificate determines authorized scope of actions allowed for a reconfiguration of the mobile network to account for the disaster. Third, the Nnef API is defined or extended to inform the network orchestrator 138 to dynamically instantiate resources for the area affected to maximize coverage and provide adequate service to the disaster area 148. As explained above, call admission control is implemented for certain devices and preferential treatment of certain classes of devices for essential services is provided.

In one or more example embodiments, a system is provided that enables a disaster recovery agency to inform a mobile service provider about a disaster to provide specific information about the disaster so that an entire network, or one or more portions of a network, is/are reconfigured to better serve the population of an area affected by the disaster through extensions and additional service APIs to the mobile core network functions.

Figure 3:
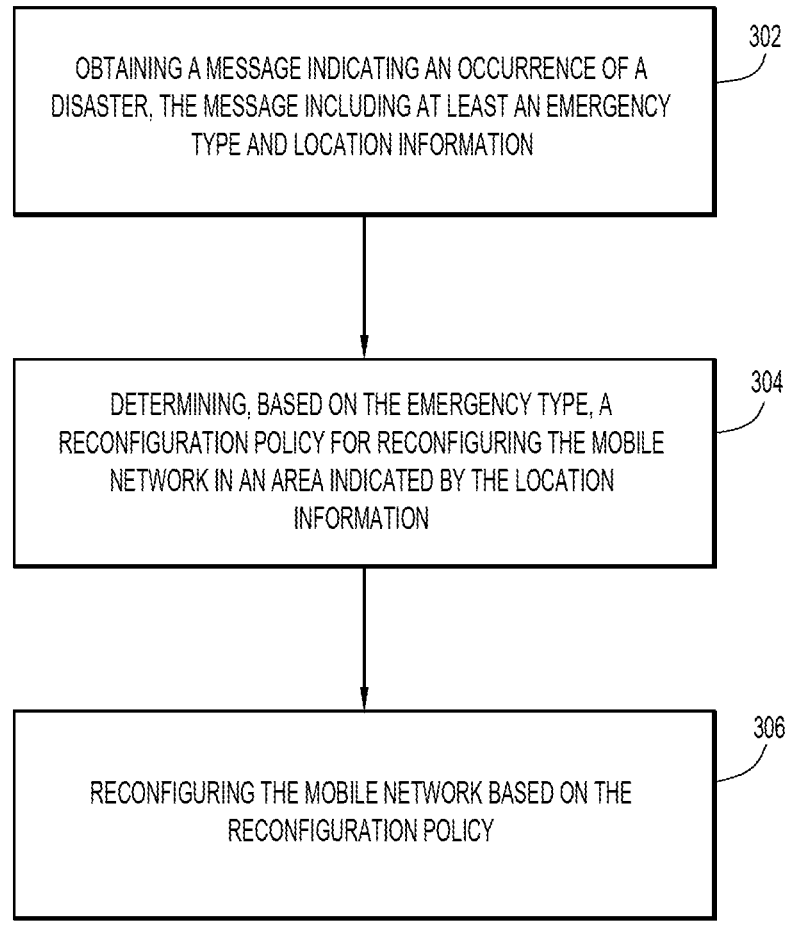
FIG. 3 is a flowchart illustrating a method of reconfiguring a mobile network to account for a disaster, according to an example embodiment.

FIG. 3 is a flowchart illustrating a method 300 of reconfiguring a mobile network to account for a disaster, according to an example embodiment. The method 300 may be executed by a network device of a service provider which provides access for wireless devices to a mobile network. The method includes, at 302, obtaining a message indicating an occurrence of a disaster, the message including at least an emergency type and location information. At 304, the method further includes determining, based on the emergency type, a reconfiguration policy for reconfiguring the mobile network in an area indicated by the location information. At 306, the method includes reconfiguring the mobile network based on the reconfiguration policy.

According to one or more example embodiments, the reconfiguring operation 306 based on the reconfiguration policy includes dynamically re-allocating resources in the mobile network for the area to maximize services and coverage in the area.

According to one or more example embodiments, the reconfiguring operation 306 based on the reconfiguration policy includes one or more of: instantiating a virtual network function (VNF) to maintain service continuity in the area or adding a new service in the area to accommodate for the disaster.

According to one or more example embodiments, the adding of the new service includes generating a new network slice that includes a new user plane function (UPF) and a new virtual radio access network (vRAN).

According to one or more example embodiments, the method further includes updating a unified data management (UDM) entity in the mobile network to provide an enhanced service to a set of the wireless devices in the area based on the reconfiguration policy.

According to one or more example embodiment, the method further includes providing a notification to a session handling function of the mobile network, the notification indicating that the mobile network in the area has been reconfigured; and providing to the session handling function reconfiguration information about how the mobile network has been reconfigured.

According to one or more example embodiments, the reconfiguring operation 306 based on the reconfiguration policy includes selecting a set of the wireless devices subscribed for service in the area based on subscription information of the service provider and providing an enhanced quality of service (QoS) to the set of the wireless devices.

According to one or more example embodiments, the emergency type includes a class of the disaster and a priority of the disaster.

According to one or more example embodiments, the determining the reconfiguration policy is further based on status reports from a network repository function, which includes an indication of one or more failures in an infrastructure of the mobile network in the area.

Figure 4:
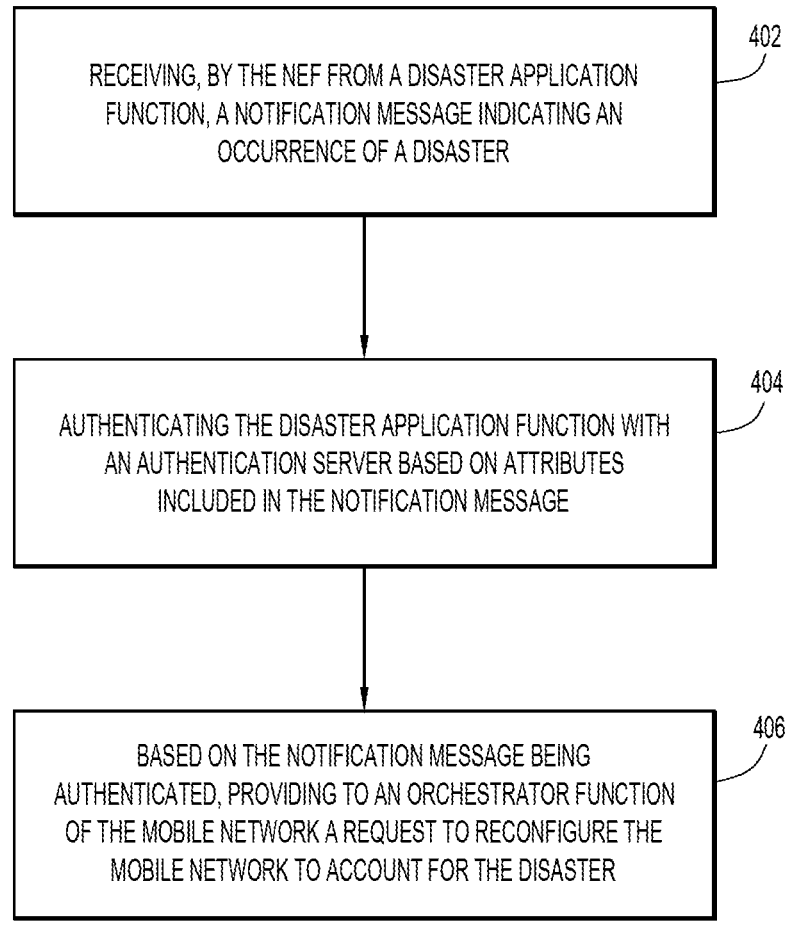
FIG. 4 is a flowchart illustrating a method of validating a notification about an occurrence of a disaster, according to an example embodiment.

FIG. 4 is a flowchart illustrating a method 400 of validating a notification about an occurrence of a disaster, according to an example embodiment. The method 400 is performed at a network device of a mobile network. The network device executes a network exposure function (NEF) in a service provider domain. The method 400 includes, at 402 receiving, by the NEF from a disaster application function, a notification message indicating an occurrence of a disaster. At 404, the method includes authenticating the disaster application function with an authentication server based on attributes included in the notification message. The method further includes at 406, based on the notification message being authenticated, providing to an orchestrator function of the mobile network a request to reconfigure the mobile network to account for the disaster.

According to one or more example embodiments, the authenticating operation 404 includes providing, by the NEF to the authentication server, a request for an authentication of the notification message. The request includes a message identifier and a signature obtained from the attributes of the notification message. The authenticating operation 404 may further include obtaining, by the NEF from the authentication server, a response indicating that the notification message is authenticated based on validating the disaster application function and based on validating the notification message, using the signature and the message identifier. The request to reconfigure the mobile network is provided to the orchestrator function, such as a network orchestrator that reconfigures the mobile network or a network repository function (NRF) that checks for network failures based on the attributes of the notification message and provides reconfiguration rules to the network orchestrator.

According to one or more example embodiments, the signature of the disaster application function is stored in the authentication server along with information about the disaster application function obtained during registration of the disaster application function with the authentication server.

According to one or more example embodiments, the request to reconfigure includes a location of the disaster, a severity level of the disaster, and a duration of the disaster determined based on the notification message.

According to one or more example embodiments, the notification message further includes a first data field indicating a type of the disaster, a second data field indicating a priority of the disaster, and a third data field indicating one or more geographic locations affected by the disaster.

Figure 5:
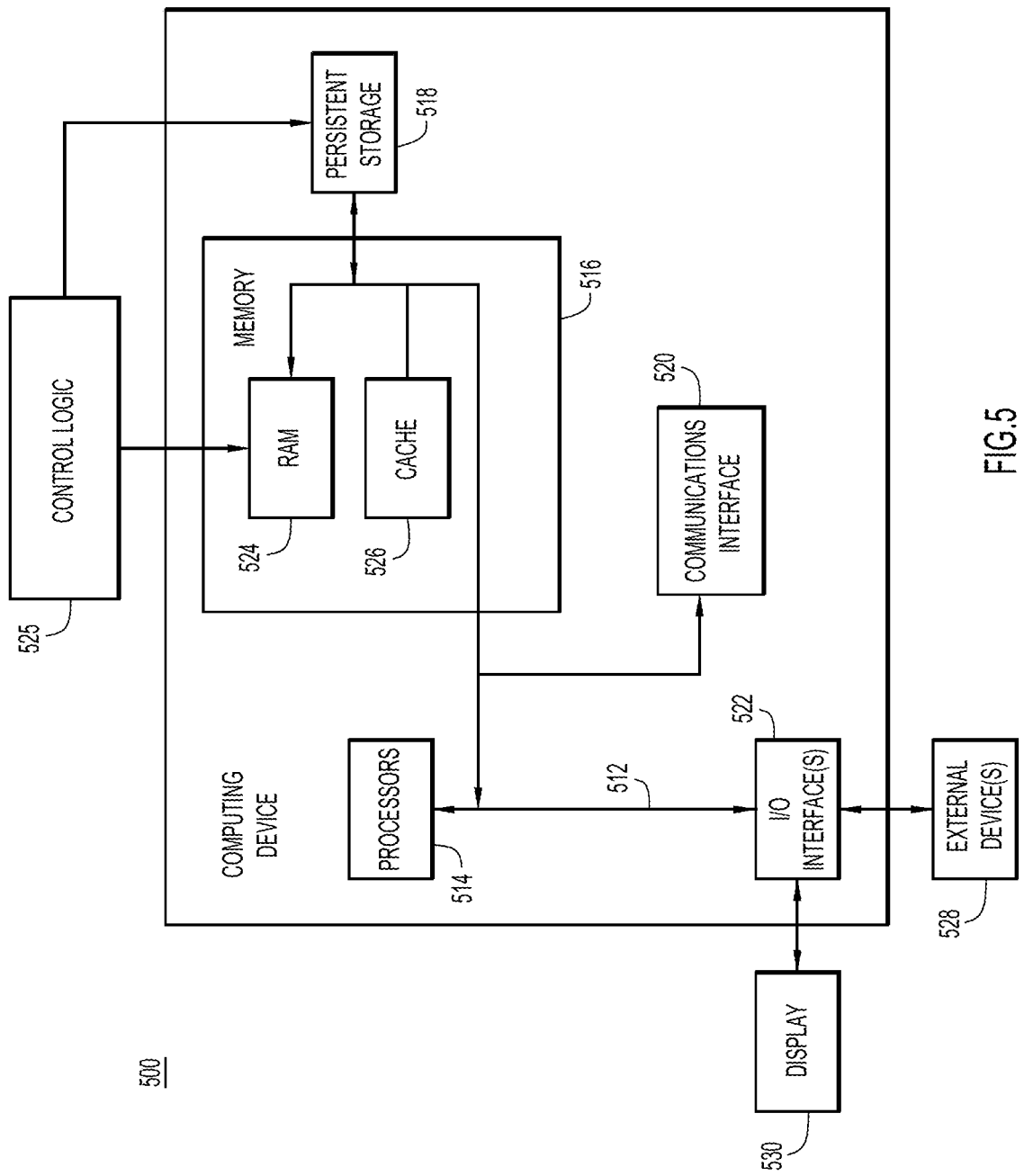
FIG. 5 is a hardware block diagram of a computing device configured to reconfigure a mobile network to account for a disaster and to validate a notification about an occurrence of the disaster, according to various example embodiments.

FIG. 5 is a hardware block diagram of a computing device 500 configured to perform the functions of a device that performs the operations described herein in connection with FIGS. 1-4, according to various example embodiments. In one example, the computing device 500 is generally representative of a network device of a service provider referred to herein. It should be appreciated that FIG. 5 provides only an illustration of various embodiments and does not imply any limitations with regard to the environments in which different embodiments may be implemented. Many modifications to the depicted environment may be made. The methods explained above may be executed by one or more processors of a servicer and/or a network equipment.

As depicted, the computing device 500 includes a bus 512, which provides communications between computer processor(s) 514, a memory 516, a persistent storage 518, communications unit 520, and input/output (I/O) interface(s) 522. The bus 512 can be implemented with any architecture designed for passing data and/or control information between processors (such as microprocessors, communications and network processors, etc.), system memory, peripheral devices, and any other hardware components within a system. For example, the bus 512 can be implemented with one or more buses.

The memory 516 and persistent storage 518 are computer readable storage media. In the depicted embodiment, the memory 516 includes a random access memory (RAM) 524 and a cache (cache memory) 526. In general, the memory 516 can include any suitable volatile or non-volatile computer readable storage media that stores instructions for the control logic 525.

The control logic 525 includes instructions that, when executed by the computer processor(s) 514, cause the computing device 500 to perform one or more of the methods described herein including a method of reconfiguring a mobile network to account for a disaster and a method of validating a notification about an occurrence of a disaster. The control logic 525 may be stored in the memory 516 or the persistent storage 518 for execution by the computer processor(s) 514.

One or more programs may be stored in persistent storage 518 for execution by one or more of the respective computer processor(s) 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by the persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

The communications unit 520, in these examples, provides for communications with other data processing systems or devices. In these examples, communications unit 520 includes one or more network interface cards. Communications unit 520 may provide communications through the use of either or both physical (wired) and wireless communications links.

The I/O interface(s) 522 allows for input and output of data with other devices that may be connected to the computing device 500. For example, the I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. The display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, personal data assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, wireless access network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In still another embodiment, an apparatus is provided that includes a communication interface configured to enable network communications on a mobile network, a memory configured to store executable instructions, and a processor coupled to the communication interface and the memory and configured to perform operations. The operations include obtaining a message indicating an occurrence of a disaster, the message including at least an emergency type and location information and determining, based on the emergency type, a reconfiguration policy for reconfiguring the mobile network in an area indicated by the location information. The operations further include reconfiguring the mobile network based on the reconfiguration policy.

According to one or more example embodiments, the processor is configured to perform the reconfiguring based on the reconfiguration policy by dynamically re-allocating resources in the mobile network for the area to maximize services and coverage in the area.

According to one or more example embodiments, the reconfiguration based on the reconfiguration policy includes one or more of instantiating a virtual network function (VNF) to maintain service continuity in the area; or adding a new service in the area to accommodate for the disaster.

According to one or more example embodiments, the adding of the new service includes generating a new network slice that includes a new user plane function (UPF) and a new virtual radio access network (vRAN).

According to one or more example embodiments, the processor is further configured to perform the operations including updating a unified data management (UDM) entity in the mobile network to provide an enhanced service to a set of wireless devices from among the wireless devices in the area based on the reconfiguration policy.

According to one or more example embodiments, the processor is further configured to perform the operations including providing a notification to a session handling function of the mobile network. The notification indicating that the mobile network in the area has been reconfigured. The processor is further configured to perform the operations including providing to the session handling function reconfiguration information about how the mobile network has been reconfigured.

In yet another example embodiment, a method is provided in which a notification message is provided to a service provider. The method is performed at a network device that is wireless communicating in a mobile network with an external disaster response entity and a service provider which provides access to the mobile network for endpoint devices. The network device executes a disaster application function (disaster AF). The method includes obtaining, by the disaster AF from the external disaster response entity, an informational message indicating an occurrence of a disaster and based on the informational message, determining attributes of the disaster and generating a notification message including the attributes of the disaster. The method further includes providing, to a network exposure function (NEF) of the service provider, the message such that the service provider reconfigures the mobile network to accommodate for the disaster.

In yet another example embodiment, one or more non-transitory computer readable storage media encoded with instructions are provided. When the media is executed by a processor, they cause the processor to execute the above-described methods.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a network device of a service provider which provides access to a mobile network for wireless devices:
obtaining a message indicating an occurrence of a disaster, the message including at least an emergency type and location information;
determining, based on the emergency type, a reconfiguration policy for reconfiguring the mobile network in an area indicated by the location information;
reconfiguring the mobile network based on the reconfiguration policy; and
providing a notification, to a session handling function of the mobile network, the notification indicating that the mobile network in the area has been reconfigured.

2. The method of claim 1, wherein the reconfiguring based on the reconfiguration policy includes:
dynamically re-allocating resources in the mobile network for the area to maximize services and coverage in the area.

3. The method of claim 1, wherein the reconfiguring based on the reconfiguration policy includes one or more of:
instantiating a virtual network function to maintain service continuity in the area; or
adding a new service in the area to accommodate for the disaster.

4. The method of claim 1, wherein reconfiguring the mobile network includes:
adding a new service by generating a new network slice that includes a new user plane function and a new virtual radio access network.

5. The method of claim 1, further comprising:
updating a unified data management entity in the mobile network to provide an enhanced service to a set of the wireless devices in the area based on the reconfiguration policy.

6. The method of claim 1, further comprising:
providing, to the session handling function, reconfiguration information about how the mobile network has been reconfigured.

7. The method of claim 1, wherein the reconfiguring the mobile network based on the reconfiguration policy includes:
selecting a set of the wireless devices subscribed for service in the area based on subscription information of the service provider; and
providing an enhanced quality of service to the set of the wireless devices.

8. The method of claim 1, wherein the emergency type includes a class of the disaster and a priority value of the disaster.

9. The method of claim 1, wherein the determining the reconfiguration policy is further based on status reports from a network repository function, which includes an indication of one or more failures of in an infrastructure of the mobile network in the area.

10. The method of claim 1, wherein the message includes a disaster request identifier having a revocable validity field.

11. A method comprising:
at a network device of a mobile network and that is executing a network exposure function (NEF) in a service provider domain:
receiving, by the NEF of the service provider domain from a disaster application function, a notification message indicating an occurrence of a disaster and including a location identifier and an emergency type;
authenticating the disaster application function with an authentication server based on attributes included in the notification message; and
based on the notification message being authenticated, providing to an orchestrator function of the mobile network a request to reconfigure the mobile network to account for the disaster.

12. The method of claim 11, wherein the authenticating comprises:
providing, by the NEF to the authentication server, a request for an authentication of the notification message, the request including a message identifier and a signature obtained from the attributes of the notification message; and obtaining, by the NEF from the authentication server, a response indicating that the notification message is authenticated based on validating the disaster application function and based on validating the notification message using the signature and the message identifier, wherein the request to reconfigure the mobile network is provided to the orchestrator function, which is a network orchestrator that reconfigures the mobile network or which is a network repository function (NRF) that checks for network failures based on the attributes of the notification message and provides reconfiguration rules to the network orchestrator.

13. The method of claim 12, wherein the signature of the disaster application function is stored in the authentication server along with information about the disaster application function obtained during registration of the disaster application function with the authentication server.

14. The method of claim 11, wherein the request to reconfigure includes the location of the disaster, a severity level of the disaster, and a duration of the disaster determined based on the notification message.

15. The method of claim 11, wherein the notification message further includes a first data field indicating a type of the disaster, a second data field indicating a priority of the disaster, and a third data field indicating one or more geographic locations affected by the disaster.

16. An apparatus comprising:
a communication interface configured to enable network communications on a mobile network;
a memory configured to store executable instructions; and
a processor coupled to the communication interface and the memory and configured to perform operations including:

obtaining a message indicating an occurrence of a disaster, the message including at least an emergency type and location information;

determining, based on the emergency type, a reconfiguration policy for reconfiguring the mobile network in an area indicated by the location information;

reconfiguring the mobile network based on the reconfiguration policy; and providing a notification, to a session handling function of the mobile network, the notification indicating that the mobile network in the area has been reconfigured.

17. The apparatus of claim 16, wherein the processor is configured to perform the reconfiguring based on the reconfiguration policy by dynamically re-allocating resources in the mobile network for the area to maximize services and coverage in the area.

18. The apparatus of claim 16, wherein the processor performs the reconfiguring based on the reconfiguration policy including one or more of:
instantiating a virtual network function to maintain service continuity in the area; or
adding a new service in the area to accommodate for the disaster.

19. The apparatus of claim 18, wherein the processor performs the adding of the new service by generating a new network slice that includes a new user plane function and a new virtual radio access network.

20. The method of claim 11, wherein the attributes of the notification message include a disaster request identifier and further comprising:
obtaining, by the NEF from the disaster application function, a message having the disaster request identifier with a validity that is revoked by the disaster application function.

* * * * *